Sept. 3, 1963               L. PARKIN               3,102,308
FASTENER MEANS FOR DETACHABLY SECURING TWO
ANGULARLY DISPOSED MEMBERS TO ONE ANOTHER
Filed Oct. 9, 1959                               2 Sheets-Sheet 1
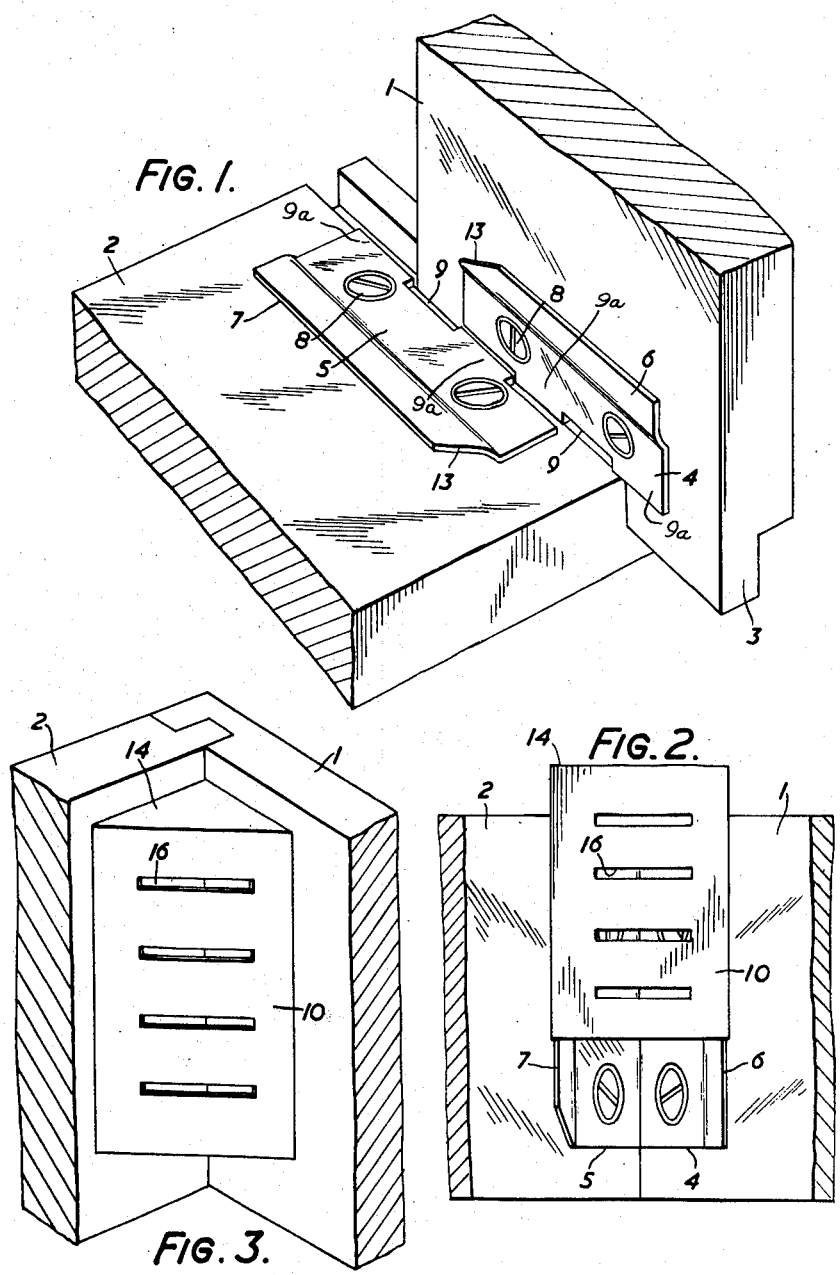
INVENTOR
LESLIE PARKIN.
BY Walter S. Jones
ATTORNEY INVENTOR
LESLIE PARKIN.
BY Walter S. Jones

ATTORNEY

United States Patent Office 3,102,308
Patented Sept. 3, 1963

3,102,308
FASTENER MEANS FOR DETACHABLY SECURING TWO ANGULARLY DISPOSED MEMBERS TO ONE ANOTHER
Leslie Parkin, Bobbers Hill, England, assignor to United-Carr Fastener Corporation, Wilmington, Del., a corporation of Delaware
Filed Oct. 9, 1959, Ser. No. 845,558
Claims priority, application Great Britain Oct. 17, 1958
1 Claim. (Cl. 20—92)

This invention relates to fastener means for detachably securing two angularly disposed members to one another, for example for securing the adjacent ends of angularly disposed parts of a frame of a drawer or other article of furniture.

It is an object of the invention to provide means whereby parts of a unit of furniture, such as a drawer, may be readily and securely assembled and yet may be equally readily disassembled when required.

According to the present invention, an assembly comprises two members arranged at an angle to one another with one end of one member in juxtaposed relation to an end of the other member and detachably secured to one another by fastening means comprising a plate-like part secured to the juxtaposed end of each member, each plate-like part having an abutment, and a connector part having means engageable with the abutment of each plate-like part by sliding the connector part relatively to said plate-like parts.

The present invention also provides fastening means for detachably securing the juxtaposed ends of two angularly disposed members, said means comprising a plate-like part adapted to be secured to each of said juxtaposed ends, each plate-like part having an abutment, and a connector part having means at opposed edges capable of making interlocking engagement with the abutments of the respective plate-like parts by sliding action.

Each abutment may comprise a flange facing away from the juxtaposed end of the respective member, the connector part having a pair of inwardly facing flanges adapted to make sliding engagement over the flanges on the plate-like parts so as to draw together the ends of the members to which the plate-like parts are attached.

The flange on each plate-like part may be formed by offsetting the edge remote from the juxtaposed end of the member to which it is attached and the flanges on the connector part may be formed by inwardly bending the opposed side edges of the said part.

The plate-like parts and connector part may be made of sheet metal.

Advantageously the plate-like parts and the connector part have the same length, and the latter has an inturned stop member at one end which in assembly abuts the adjacent ends of the two plate-like parts.

The connector part may have one or more transverse slots so that a tool such as a screwdriver may be inserted into any one of the slots to slide off the connector part when it is required to disassemble the two members.

Further, each plate-like part may be formed with a longitudinal recess along part of its edge adjacent the juxtaposed end of the respective member to receive the unrecessed part of the side edge of the other plate-like part, so that the unrecessed part abuts the adjacent member when the two members are in abutting relation.

Advantageously, the offset flange of at least one of the two plate-like parts is tapered at the end from which the connector part is slid on to provide a lead to facilitate the assembly of the connector part.

Embodiments of the present invention will now be described with reference to the accompanying drawing, of which, FIGURE 1 is a perspective view of two members in one stage of assembly.

FIGURE 2 is a similar view showing a further stage assembly,

FIGURE 3 is a similar view showing the members finally assembled,

Figure 4:
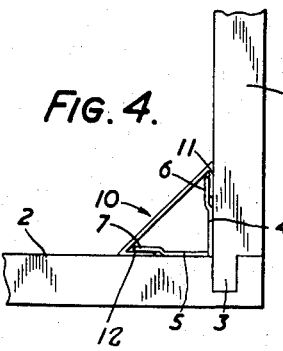
FIGURE 4 is a bottom view of FIGURE 3.
Figure 5:
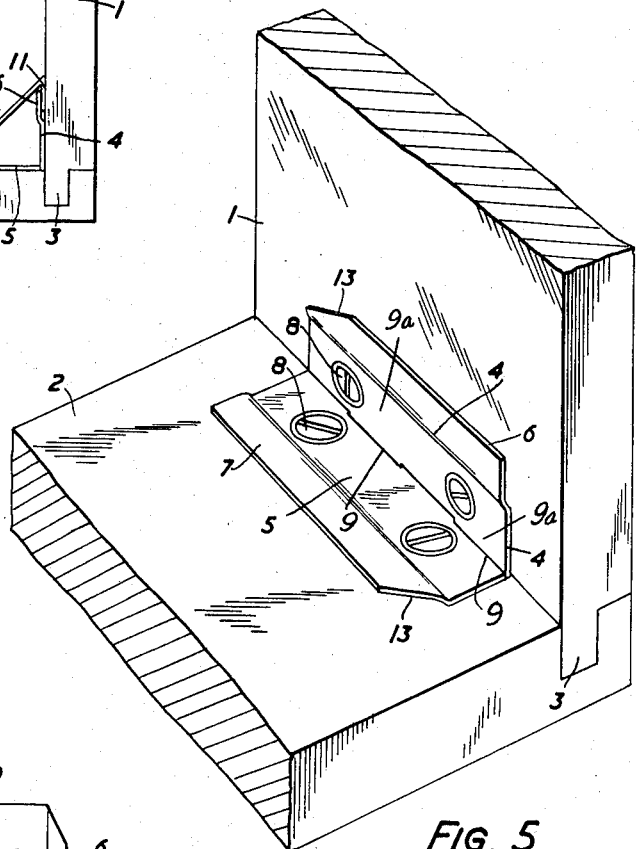
FIGURE 5 is a similar view to FIGURE 1 showing the plate-like parts in interengaged assembly.
Figure 6:
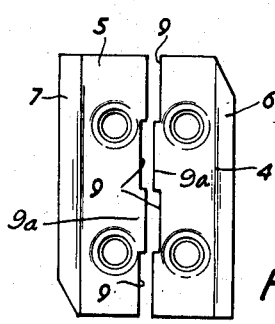
FIGURE 6 is a plan view of the plate-like parts seen in FIGURES 1 and 5.

With reference to the accompanying drawing, a fastener means is used to connect the four side walls of a wooden drawer at the corners of the drawer, only one corner being shown. The juxtaposed ends of the side walls 1, 2 at the corner of the drawer are in abutment and as shown form an interlocking joint 3. Plate-like parts 4, 5 of the fastener means are secured to each wall, 1, 2 spaced inwardly of their ends such that an abutment flange 6, 7 extending from the side edge of each plate-like part is spaced from its respective wall. The plate-like parts are secured to their respective side walls, for example, by screws 8.

Each plate-like part 4, 5 is formed with recesses 9 along part of its side edge nearest the corner to receive the unrecessed parts or lugs 9a of the side edge of the other plate-like part on the adjacent side wall, so that the unrecessed parts or lugs 9a of each plate-like part abuts the adjacent side-wall.

The two members 1, 2 are assembled into abutting relation by a proper manipulation of the parts that are to be assembled.

The flange 6 and flange 7 on the plate-like parts 4, 5 are offset so as to be spaced from the wall of the drawer to which they are attached.

The connector part 10 is assembled with the two plate-like parts 4, 5 at each corner of the drawer by sliding inturned side edges 11, 12 of the connector part 10 over the flanges 6, 7 of the two plate-like parts from one end of the said plate-like parts, as shown in FIG. 4. To facilitate this assembly, the offset side edge of one or both of the plate-like parts at the said one end has a taper 13 to provide a lead for the end of the connector part 10.

The connector part 10 has an inturned stop member 14 (FIG. 3) at one end which abuts the plate-like parts 4, 5 to limit the travel of the connector plate 10 during assembly. As shown, the stop member 14 is shaped to fit the corner of the drawer and form a cover for the top ends of the plate-like parts 4, 5.

The connector part 10 also has one or more longitudinally spaced transverse slots 16 into any one of which a tool such as a screwdriver may be inserted when it is desired to disassemble the drawer and remove the connector part 10 from the two-plate-like parts 4, 5. Such a tool is needed since the connector part 10 makes a tight fit with the plate-like parts 4, 5 to ensure that the assembly is secure and rattling prevented.

It will be understood that the invention is not limited to securing parts of a wooden drawer, but may be used for connecting members adapted to form a frame of an article of furniture such as a table top. In the latter case the connector parts 10 may be adapted to have table legs detachably secured thereto by suitable means.

The fastener means is particularly suitable for use in "knock down" furniture or furniture units wherein prefabricated parts are adapted to be stored, transported and assembled at the place of use. Previously it has not been considered practicable to make units such as drawers or table tops of "knock down" parts and accordingly these have been preassembled at a factory. By use of the fastener means of the present invention such units need not now be preassembled, and the parts can be transported and stored in a compact form.

I claim:

An assembly comprising two members arranged in abutting angular relationship to provide a corner, one of said members having an abutment end and the other having an abutment face, said end and said face each having integral means for interlocking with each other to prevent relative rotation of one member with respect to the other about an axis drawn on the line of abutment between said face and said end, and fastener means co-operating to hold said two members in assembly, said fastener means including a connector part and two unitary plate-like parts, each of said plate-like parts having a flat base with a face edge formed on one edge and with an integral abutment flange formed on an opposite edge, each of said members having one of said plate-like parts secured thereto adjacent the corner formed by said members and the plane of each of said abutment flanges offset from the plane of its respective base, and each of said plate-like parts having alternating notches and lugs, formed on said face edge, and interlocked with each other, said lugs and notches directed toward the corner formed by said members, said connector part having a flat base, said connector base portion having a pair of side edges spaced from each other and a pair of integral side flanges extending from said side edges in acute, angular relationship with said connector base portion and in spaced relation to each other, each of said side flanges slidably engaging an abutment flange.

References Cited in the file of this patent

UNITED STATES PATENTS

| | | |
|---|---|---|
| 1,095,636 | Hummer | May 5, 1914 |
| 1,919,780 | Fairbank | July 25, 1933 |
| 2,340,545 | Marsh | Feb. 1, 1944 |
| 2,405,643 | Crot | Aug. 13, 1946 |
| 2,666,241 | Hall | Jan. 19, 1954 |
| 2,774,121 | Graevenitz | Dec. 18, 1956 |
| 2,787,037 | Hobbs | Apr. 2, 1957 |
| 2,793,407 | Johnston | May 28, 1957 |

FOREIGN PATENTS

| | | |
|---|---|---|
| 367,784 | Germany | Jan. 26, 1923 |
| 408,376 | Germany | Jan. 17, 1925 |
| 616,989 | France | Nov. 8, 1926 |
| 450,693 | Germany | Oct. 13, 1927 |
| 654,045 | Germany | Dec. 8, 1937 |
| 1,028,733 | France | Feb. 25, 1953 |
| 757,262 | Great Britain | Sept. 19, 1956 |